(12) United States Patent
Brasseur (10) Patent No.: US 7,621,072 B2
(45) Date of Patent: Nov. 24, 2009

(54) STACKABLE CASTING SINKER (76) Inventor: Bernard P. Brasseur, 168 Center Rd., Cornish, NH (US) 03745

( * ) Notice: Subject to any disclaimer, the term of this patent is extended or adjusted under 35 U.S.C. 154(b) by 0 days.

(21) Appl. No.: 11/828,421

(22) Filed: Jul. 26, 2007

(65) Prior Publication Data

US 2008/0250695 A1 Oct. 16, 2008

Related U.S. Application Data (60) Provisional application No. 60/911,128, filed on Apr. 11, 2007.

(51) Int. Cl.
A01K 95/00 (2006.01)

(52) U.S. Cl. .............. 43/44.97; 43/44.96; 43/43.14; 43/43.1; 43/43.15; 43/42.34; D22/145

(58) Field of Classification Search .......... 43/43.14, 43/43.15, 43.12, 43.1, 44.87, 42.34, 44.97, 43/44.96; D22/145
See application file for complete search history.

(56) References Cited

U.S. PATENT DOCUMENTS

| 77,774 | A | * | 5/1868 | Smith | 43/43.14 |
|---|---|---|---|---|---|
| 402,231 | A | * | 4/1889 | Coles | 43/43.14 |
| 501,346 | A | * | 7/1893 | Homan | 43/43.14 |
| 549,332 | A | * | 11/1895 | Sewell | 43/43.14 |
| 565,030 | A | * | 8/1896 | Quinan | 43/43.14 |
| 824,198 | A | * | 6/1906 | Norton | 43/43.1 |
| 883,048 | A | * | 3/1908 | Pflueger | 43/43.1 |
| 1,023,676 | A | * | 4/1912 | Pancoast | 43/43.14 |
| 1,050,748 | A | * | 1/1913 | Paulsson | 43/43.14 |
| 1,453,987 | A | * | 5/1923 | Mills | 43/43.1 |
| 1,480,099 | A | * | 1/1924 | Murphy | 43/43.14 |
| 1,500,463 | A | * | 7/1924 | Mattern | 43/43.14 |
| 1,549,121 | A | * | 8/1925 | Knill | 43/43.1 |

(Continued)

FOREIGN PATENT DOCUMENTS

DE 4318191 A1 * 12/1994

(Continued)

OTHER PUBLICATIONS

Kindersley, D. "Torpedo." in: Dorling Kindersley Encyclopedia of Fishing (New York., Dorling Kindersley Inc., 1994), p. 61. SH411. E48 1993 c.3.*

*Primary Examiner*—Darren W Ark
(74) *Attorney, Agent, or Firm*—Michael J. Weins; Jeffrey E. Semprebon (57) ABSTRACT A number of stackable weights can be bundled together and secured with a lashing to form a modular sinker of a desired weight. Each stackable weight has an elongated bar bounded by four side surfaces and having a fixed eye. A link member is movably attached to the fixed eye and terminates in a coupling eye. The link member provides a degree of motion between the coupling eye and the fixed eye of the bar, allowing the coupling eyes of multiple stackable weights to be connected together to a single fastener while the bars are positioned together in a side-by-side relationship. When so connected, the link members form a pyramid-shaped coupling structure that will reduce the likelihood of snagging the resulting modular sinker. The bars preferably have textured side surfaces to frictionally engage each other to maintain the bars parallel and to retain an elastic band that provides the lashing.

17 Claims, 4 Drawing Sheets

U.S. PATENT DOCUMENTS

| | | | | |
|---|---|---|---|---|
| 1,560,938 | A | * | 11/1925 | Lund ................... 43/43.14 |
| 1,692,222 | A | * | 11/1928 | Pagin ................... 43/42.34 |
| 1,698,964 | A | * | 1/1929 | Pagin ................... 43/42.34 |
| 1,766,532 | A | * | 6/1930 | Pflueger ................ 43/43.1 |
| 1,787,733 | A | * | 1/1931 | Pagin ................... 43/42.34 |
| 1,846,130 | A | * | 2/1932 | Martin .................. 43/42.34 |
| 1,847,397 | A | * | 3/1932 | Hofschneider ........ 43/42.34 |
| 1,848,704 | A | * | 3/1932 | Farley ................. 43/42.34 |
| 1,858,550 | A | * | 5/1932 | Kahle .................. 43/43.14 |
| 1,862,893 | A | * | 6/1932 | Holtzclaw ............. 43/42.34 |
| 1,897,291 | A | * | 2/1933 | Andrews ................ 43/43.1 |
| 1,997,500 | A | * | 4/1935 | Swarovski ............ 43/42.34 |
| D100,482 | S | * | 7/1936 | Tripp ................... 43/43.1 |
| D101,502 | S | * | 10/1936 | Moitoza ............... 43/43.1 |
| 2,065,246 | A | * | 12/1936 | Saarinen ............. 43/42.34 |
| 2,083,630 | A | * | 6/1937 | Angelica .............. 43/43.1 |
| 2,086,457 | A | * | 7/1937 | Zielesch ............... 43/43.1 |
| 2,117,206 | A | * | 5/1938 | Neff ................... 43/42.34 |
| 2,121,279 | A | * | 6/1938 | Beck ................... 43/43.14 |
| 2,177,007 | A | * | 10/1939 | Smith .................. 43/43.14 |
| 2,192,563 | A | * | 3/1940 | Starkey ............... 43/42.34 |
| 2,228,513 | A | * | 1/1941 | Frisbie ................. 43/43.14 |
| 2,230,456 | A | * | 2/1941 | Henze ................. 43/43.14 |
| 2,231,616 | A | * | 2/1941 | Costantino ........... 43/43.15 |
| 2,256,768 | A | * | 9/1941 | Taylor ................. 43/44.96 |
| 2,303,753 | A | * | 12/1942 | Merle ................... 43/43.1 |
| 2,313,647 | A | * | 3/1943 | Knill et al. ............. 43/43.1 |
| 2,326,876 | A | * | 8/1943 | Miller ................. 43/43.12 |
| 2,338,577 | A | * | 1/1944 | Divine ................ 43/42.34 |
| 2,340,608 | A | * | 2/1944 | Merle ................... 43/43.1 |
| 2,399,371 | A | * | 4/1946 | Mendelson ............ 43/43.1 |
| 2,406,252 | A | * | 8/1946 | Potter .................. 43/44.9 |
| 2,457,358 | A | * | 12/1948 | Flaugher ............. 43/44.96 |
| D154,141 | S | * | 6/1949 | Pilblad ................. 43/42.34 |
| 2,480,580 | A | * | 8/1949 | Hopkins .............. 43/42.34 |
| 2,503,607 | A | * | 4/1950 | Arff .................... 43/42.34 |
| 2,517,375 | A | * | 8/1950 | Anderson ............. 43/43.14 |
| 2,519,104 | A | * | 8/1950 | Blomgren ............ 43/44.97 |
| 2,547,240 | A | * | 4/1951 | Young et al. ......... 43/42.34 |
| 2,557,776 | A | * | 6/1951 | Anderson ............ 43/43.14 |
| 2,573,981 | A | * | 11/1951 | Nelson ............... 43/44.96 |
| 2,577,549 | A | * | 12/1951 | Vice ................... 43/44.97 |
| 2,584,356 | A | * | 2/1952 | Larson ................ 43/43.14 |
| 2,589,715 | A | * | 3/1952 | Lysikowski ........... 43/43.14 |
| 2,591,294 | A | * | 4/1952 | Ripich ................ 43/43.15 |
| 2,594,620 | A | * | 4/1952 | Braithwaite .......... 43/43.1 |
| 2,600,002 | A | * | 6/1952 | Klein .................. 43/43.14 |
| 2,611,988 | A | * | 9/1952 | Gibson ............... 43/44.96 |
| 2,623,323 | A | * | 12/1952 | Knott et al. .......... 43/44.96 |
| 2,644,266 | A | * | 7/1953 | Updegrove .......... 43/44.96 |
| 2,651,135 | A | * | 9/1953 | Greenleaf ............ 43/43.14 |
| 2,651,136 | A | * | 9/1953 | Kruze ................. 43/44.96 |
| 2,655,758 | A | * | 10/1953 | Warren ............... 43/43.15 |
| 2,657,495 | A | * | 11/1953 | Eppinger ............. 43/42.34 |
| 2,665,515 | A | * | 1/1954 | Frantello ............. 43/42.34 |
| 2,729,014 | A | * | 1/1956 | Johnson .............. 43/43.14 |
| 2,736,125 | A | * | 2/1956 | Perkins .............. 43/42.34 |
| 2,739,408 | A | * | 3/1956 | Eatinger ............. 43/43.14 |
| 2,749,650 | A | * | 6/1956 | Rees .................. 43/43.12 |
| 2,765,571 | A | * | 10/1956 | Sinclair .............. 43/42.34 |
| 2,766,548 | A | * | 10/1956 | Willardsen .......... 43/43.1 |
| 2,770,908 | A | * | 11/1956 | Hessert, Jr. .......... 43/43.15 |
| 2,774,174 | A | * | 12/1956 | Ganger .............. 43/44.99 |
| 2,787,078 | A | * | 4/1957 | Aliber ................. 43/43.14 |
| 2,801,490 | A | * | 8/1957 | Daves ................. 43/43.1 |
| 2,804,715 | A | * | 9/1957 | Kimbrough ......... 43/44.87 |
| 2,833,079 | A | * | 5/1958 | Flaska ............... 43/42.34 |
| 2,841,911 | A | * | 7/1958 | Dahlgren ............ 43/43.12 |
| 2,842,889 | A | * | 7/1958 | Ganger .............. 43/44.99 |
| 2,863,253 | A | * | 12/1958 | Hettinger ............. 43/43.14 |
| 2,906,055 | A | * | 9/1959 | Pizzani ............... 43/43.14 |
| 2,917,861 | A | * | 12/1959 | Hines ................. 43/44.96 |
| 2,937,468 | A | * | 5/1960 | Scheifele ............ 43/43.1 |
| 2,958,153 | A | * | 11/1960 | Yerman et al. ....... 43/43.14 |
| 2,985,981 | A | * | 5/1961 | King .................. 43/43.14 |
| 3,030,726 | A | * | 4/1962 | Knapton ............. 43/43.15 |
| 3,084,469 | A | * | 4/1963 | Stratton .............. 43/43.14 |
| 3,084,471 | A | * | 4/1963 | Alspaugh ............ 43/43.14 |
| 3,102,359 | A | * | 9/1963 | Cahill et al. ......... 43/43.14 |
| 3,103,199 | A | * | 9/1963 | Gagnon .............. 43/43.1 |
| 3,114,984 | A | * | 12/1963 | Atton ................. 43/43.15 |
| 3,133,345 | A | * | 5/1964 | Shaw ................. 43/43.1 |
| 3,133,372 | A | * | 5/1964 | Born .................. 43/42.34 |
| 3,151,414 | A | * | 10/1964 | Hoerner ............. 43/44.97 |
| 3,167,879 | A | * | 2/1965 | Beers ................. 43/44.96 |
| 3,180,052 | A | * | 4/1965 | Malesko ............. 43/43.14 |
| 3,195,262 | A | * | 7/1965 | Metzler .............. 43/43.12 |
| 3,204,364 | A | * | 9/1965 | Beers ................. 43/44.96 |
| 3,280,498 | A | * | 10/1966 | Decker .............. 43/43.12 |
| 3,318,037 | A | * | 5/1967 | Harrison et al. ..... 43/43.14 |
| 3,335,516 | A | * | 8/1967 | Sutton et al. ........ 43/43.14 |
| 3,341,966 | A | * | 9/1967 | Pippen .............. 43/43.15 |
| 3,346,986 | A | * | 10/1967 | Tiikkainen .......... 43/43.14 |
| 3,359,674 | A | * | 12/1967 | Strumor ............. 43/43.14 |
| 3,405,476 | A | * | 10/1968 | Pumilio .............. 43/43.14 |
| 3,408,701 | A | * | 11/1968 | Decker .............. 43/43.12 |
| 3,413,751 | A | * | 12/1968 | Biddle ............... 43/44.97 |
| 3,449,854 | A | * | 6/1969 | Sinclair .............. 43/43.15 |
| 3,461,597 | A | * | 8/1969 | Hobson .............. 43/43.14 |
| 3,490,167 | A | * | 1/1970 | Turle ................. 43/44.97 |
| 3,513,583 | A | * | 5/1970 | Leash et al. ........ 43/43.12 |
| 3,535,815 | A | * | 10/1970 | Lowndes ............ 43/43.12 |
| 3,568,355 | A | * | 3/1971 | Hassell .............. 43/43.14 |
| 3,579,893 | A | * | 5/1971 | Wolfe ................ 43/43.1 |
| 3,609,908 | A | * | 10/1971 | Martin ............... 43/44.97 |
| 3,648,398 | A | * | 3/1972 | Newell .............. 43/43.14 |
| 3,656,253 | A | * | 4/1972 | Gaunt ............... 43/42.34 |
| 3,667,151 | A | * | 6/1972 | Lamb ................ 43/44.97 |
| 3,670,447 | A | * | 6/1972 | Wohead ............ 43/43.14 |
| 3,688,431 | A | * | 9/1972 | Nichols et al. ...... 43/43.14 |
| 3,693,972 | A | * | 9/1972 | Minchin ............. 43/43.1 |
| 3,736,690 | A | * | 6/1973 | Witkowski .......... 43/43.14 |
| 3,745,685 | A | * | 7/1973 | Swarthout ........... 43/42.34 |
| 3,771,252 | A | * | 11/1973 | Odenwald .......... 43/44.97 |
| 3,898,758 | A | * | 8/1975 | Swanningson ....... 43/43.12 |
| 3,925,921 | A | * | 12/1975 | Tucker et al. ....... 43/44.97 |
| 3,940,871 | A | * | 3/1976 | Evans ............... 43/44.97 |
| 3,943,654 | A | * | 3/1976 | Shine ................ 43/43.14 |
| 4,019,275 | A | * | 4/1977 | Ruppe .............. 43/44.96 |
| 4,040,199 | A | * | 8/1977 | Raptis ............... 43/43.14 |
| 4,060,927 | A | * | 12/1977 | Haun et al. ........ 43/43.1 |
| 4,389,805 | A | * | 6/1983 | Hargrave ........... 43/43.14 |
| 4,494,334 | A | * | 1/1985 | Porter ............... 43/43.12 |
| 4,571,879 | A | * | 2/1986 | Peroff ............... 43/44.97 |
| 4,631,854 | A | * | 12/1986 | Rosko ............... 43/42.34 |
| 4,649,662 | A | * | 3/1987 | Tharp et al. ........ 43/43.14 |
| 4,679,349 | A | * | 7/1987 | Birchfield .......... 43/44.97 |
| 4,693,030 | A | * | 9/1987 | Wohead ............ 43/43.14 |
| 4,750,288 | A | * | 6/1988 | Brennan ............ 43/43.1 |
| 4,750,289 | A | * | 6/1988 | Rossa ............... 43/44.96 |
| 4,771,565 | A | * | 9/1988 | Shepherd .......... 43/43.1 |
| 4,819,364 | A | * | 4/1989 | Lill .................... 43/43.1 |
| 4,837,968 | A | * | 6/1989 | Lin ................... 43/43.14 |
| 4,916,849 | A | * | 4/1990 | Radtchenko ........ 43/43.1 |
| 4,949,645 | A | * | 8/1990 | Hayward et al. ..... 43/44.87 |
| 5,054,227 | A | * | 10/1991 | Lin ................... 43/43.12 |
| 5,088,228 | A | * | 2/1992 | Waldie, Jr. .......... 43/43.12 |
| 5,101,592 | A | * | 4/1992 | Merritt ............... 43/44.96 |
| 5,105,576 | A | * | 4/1992 | Kohus ............... 43/44.87 |
| 5,233,786 | A | * | 8/1993 | Biss .................. 43/43.14 |
| 5,235,777 | A | * | 8/1993 | Burns ................ 43/43.14 |
| 5,243,779 | A | * | 9/1993 | Reed ................. 43/43.14 |
| 5,303,499 | A | * | 4/1994 | Miller ................ 43/43.14 |
| 5,335,443 | A | * | 8/1994 | Grigsby, Jr. ......... 43/43.14 |

| | | | | | |
|---|---|---|---|---|---|
| 5,359,804 A * | 11/1994 | Burns ................... 43/43.14 |
| 5,375,365 A * | 12/1994 | Bronder ................ 43/43.12 |
| D359,544 S * | 6/1995 | Sadykov ................ D22/126 |
| 5,461,821 A * | 10/1995 | Carter, Jr. ............. 43/43.12 |
| 5,531,042 A * | 7/1996 | Rinker et al. .......... 43/43.14 |
| 5,548,919 A * | 8/1996 | Hicks ................... 43/43.14 |
| 5,555,668 A * | 9/1996 | Brasseur ............... 43/43.15 |
| 5,595,016 A * | 1/1997 | Feher ................... 43/44.87 |
| 5,661,923 A * | 9/1997 | Fellowes .............. 43/43.14 |
| D414,837 S * | 10/1999 | Galvan, II ............. D22/126 |
| 6,079,147 A * | 6/2000 | Mosher ................ 43/43.14 |
| D496,982 S * | 10/2004 | Jeffers ................. D22/145 |
| 7,340,858 B2 * | 3/2008 | Corbitt ................. 43/44.96 |
| 2007/0163165 A1 * | 7/2007 | Castro et al. .......... 43/42.34 |
| 2007/0163166 A1 * | 7/2007 | Rowe et al. ........... 43/44.97 |
| 2009/0133315 A1 * | 5/2009 | Bono .................... 43/43.14 |

FOREIGN PATENT DOCUMENTS

| | | | |
|---|---|---|---|
| EP | 882396 A1 * | 12/1998 |
| EP | 1197145 A1 * | 4/2002 |
| FR | 2777745 A1 * | 10/1999 |
| GB | 2078472 A * | 1/1982 |
| GB | 2087202 A * | 5/1982 |
| GB | 2166631 A * | 5/1986 |
| GB | 2171282 A * | 8/1986 |
| GB | 2182531 A * | 5/1987 |
| GB | 2200022 A * | 7/1988 |
| GB | 2204771 A * | 11/1988 |
| JP | 06086617 A * | 3/1994 |
| JP | 09322680 A * | 12/1997 |
| JP | 10262528 A * | 10/1998 |
| JP | 11018649 A * | 1/1999 |
| JP | 11318296 A * | 11/1999 |
| JP | 2000078943 A * | 3/2000 |
| JP | 2000166448 A * | 6/2000 |
| JP | 2000175605 A * | 6/2000 |
| JP | 2001178339 A * | 7/2001 |
| JP | 2001346487 A * | 12/2001 |
| JP | 2001346488 A * | 12/2001 |
| JP | 2002027885 A * | 1/2002 |
| JP | 2002360139 A * | 12/2002 |
| JP | 2003061514 A * | 3/2003 |
| JP | 2003061533 A * | 3/2003 |
| JP | 2003125685 A * | 5/2003 |
| JP | 2003289773 A * | 10/2003 |
| JP | 2005328701 A * | 12/2005 |
| JP | 2008005822 A * | 1/2008 |
| JP | 2008061637 A * | 3/2008 |
| WO | WO 9621839 A1 * | 7/1996 |
| WO | WO 2004032618 A1 * | 4/2004 |

* cited by examiner

STACKABLE CASTING SINKER

FIELD OF THE INVENTION

The present invention relates to sinkers employed to hold a fishing line near the bottom of a body of water, and more particularly to a modular sinker which allows the user to readily form a sinker of the desired weight while reducing the tendency of the sinker to snag or become entangled by obstructions or weeds.

BACKGROUND OF THE INVENTION

Anglers frequently use a rod to cast a lure or bait attached to a line in order to place the lure or bait at a desired location in the water where the angler hopes to find fish. Typically, one or more sinkers are attached to the line. The sinker serves to provide sufficient weight on the line to flex the rod during the casting action, and provides weight to carry the line against the resistance of air to the desired location. The sinker then serves to maintain the lure or bait in close proximity to the bottom of a body of water.

Unfortunately, sinkers are prone to snagging on weeds, rocks, submerged branches, and similar obstacles. Snagging typically occurs when the fishing line to which the sinker is connected is moved through the water, either when the line is jerked to jump the lure or bait through the water or when reeling in the line after casting. Such snagging may result in breakage of the fishing line and loss of the sinker, and possibly loss of the lure or bait attached to the line. Breakage of the line due to snagging also requires the user to attach a new sinker and possibly a new lure or bait, taking time away from actively fishing.

The problem of loss of expensive lures can be overcome by employing a bait locating device such as taught in U.S. Pat. No. 5,555,668. The '668 bait locating device floats the lure off the bottom with a flotation member, which is connected to a sinker by a separate sinker line. In the event that the sinker does become snagged, the line to the sinker can be broken, allowing recovery of the fishing line and any expensive lure attached thereto. However, the problem of replacing the sinker still remains.

Traditionally, sinkers have been provided in streamlined shapes in an attempt to resist snagging of the sinker; however, such sinkers can still become lodged between rocks or other obstructions. Additionally, the streamlined shape of such sinkers may prevent them from gripping the bottom surface of a body of water to maintain a lure or bait in a desired position when there is a strong current in the water.

Another concern is the frequent need to change the weight of the sinker to suit conditions such as current, lure or bait size, etc. This has classically been done by replacing the sinker on the line with one of a different weight, or by removing or adding one or more sinkers that are crimped onto the fishing line. Simply replacing sinkers may be time consuming, and requires a substantial inventory of different sinker weights to be carried. Crimped-on sinkers may cause undue wear on the line, and the use of multiple sinkers on the line may increase the risk of one or more sinkers becoming snagged.

In an attempt to make weight changes more convenient, sinker devices have been designed that allow the user to readily change the weight, either by adding or removing weight units to a retaining structure or by removing a weight unit and replacing it with one having a different weight.

A rudimentary example of the first approach is taught in U.S. Pat. No. 3,943,654, which teaches a circular strip which attaches to a line and receives a desired number of discarded spark plugs, which serve as weights. The resulting device has numerous protruding elements and thus appears to be highly prone to snagging on obstructions. Furthermore, the resulting sinker would appear to have a large air resistance, which would limit the distance that it can be cast; this problem is exacerbated by the use of spark plugs, which have a relatively low density compared to conventional sinker materials, for the weight units. A more refined device is taught in U.S. Pat. No. 2,863,253, where a weight attaches to the line and additional weights can be threadably attached in series. The resulting sinker is more compact and lacks the protrusions of the '654 sinker, but the threads employed to attach the weights together may be prone to damage or wear by impacts, grit, and/or corrosion. The threaded connections may also make the weights of the '253 sinker expensive to fabricate. U.S. Pat. No. 2,589,715 teaches a trolling sinker having a shaft on which weight units can be slid, these weight units being retained by blocks that are affixed to the shaft by set screws. The use of set screws complicates the process of changing the weight, and may be difficult to accomplish with wet and/or cold hands, as the angler would need to manipulate small objects to loosen and re-tighten the set screws. U.S. Pat. Nos. 1,858,550 and 2,600,002 teach sinkers having streamlined capsules in which a desired number of balls are placed to adjust the weight. Again, the requirement that the user manipulate several small objects to change the weight may make adjustment of the weight difficult in actual angling conditions. Furthermore, the streamlined capsules would appear to provide relatively little ability to grip the bottom surface, limiting their suitability in conditions where a strong current is present.

The second approach to varying the sinker weight, using a single replaceable weight, is taught in U.S. Pat. Nos. 3,648, 398 and 5,461,821. These patents teach sinkers that have a weight held in a resilient tube, to which the line is attached. The weight of the sinker can be readily changed by pulling the weight from the tubing and substituting a different weight. However, these devices appear to be limited in the amount of weight that can be employed in the sinker, since a relatively large weight would require the weight to be excessively long. Such a long, rigid weight may be difficult to cast, may be more prone to snagging, and may provide limited ability to grip the bottom surface. Also, an excessively long weight is difficult to store conveniently. Since the weight is intended to be squeezed out of the tube in the event that the weight becomes jammed by obstructions, it appears that it may be difficult to attaining the right degree of friction between the weight and the tubing such that the weight will not fall out of the tubing when casting, but will slip out of the tubing if it becomes jammed.

SUMMARY OF THE INVENTION

The present invention provides a stackable weight designed to be used as a building element for an adjustable-weight modular sinker, as well as the resulting sinker, which is particularly well suited for casting. The stackable weight is configured to be bundled with additional, similar stackable weights and bound together with a lashing to form a composite sinker of the desired weight, the resulting sinker being compact and attaching to the fishing line in such a manner as to reduce the likelihood of becoming snagged.

Each stackable weight has an elongated bar terminating in a leading end and a trailing end, and bounded by four side surfaces which provide a rectangular cross section. Each of the stackable weights has a fixed eye attached to the leading end of the elongated bar. A link member movably attaches to the fixed eye and terminates in a coupling eye, the movable attachment of the link member to the fixed eye serving to provide a degree of motion between the coupling eye the elongated bar. This motion allows the coupling eyes to be connected together to a single fastener when the elongated bars are stacked in a side-by-side relationship with their leading ends positioned together. When the coupling eyes are connected together in this manner, the link members form triangular-shaped coupling units that, when connected together, form a pyramid-like structure that will reduce the likelihood of snagging by providing flexible ramp surfaces that can ride over blocking obstructions such as rocks and weed tangles that could otherwise catch on the leading ends of the elongated bars. Preferably, the leading ends of the elongated bars are tapered to further reduce the likelihood of snagging.

A lashing, such as an elastic band, is provided to complete the sinker. The lashing binds the stacked weights, thus forming a bundle of the stackable weights positioned in a side-by-side relationship, with their link members arranged to be connected to a single, common fastener. This bundle of weights forms the resulting sinker, wherein the stackable weights can be readily added or removed without requiring special tools while still maintaining a compact sinker well suited for casting. Connecting the link members to a single fastener not only provides a snag-resistant structure, as pointed out above, but also provides connectivity of the weights in service even in the event that the lashing breaks.

The side surfaces of the elongated bars are preferably textured to increase sliding resistance between side surfaces of adjacent elongated bars, and between the elongated bars and the lashing without requiring special connecting elements that may complicate assemby of the desired weight size in the field while fishing. The increased friction between the side surfaces of adjacent elongated bars helps maintain the elongated bars aligned, and allows the use of a single elastic band for the lashing. The friction between the side surfaces and the lashing reduces the likelihood of the lashing slipping off the elongated bars due to rubbing against rocks or other submerged objects. The textured surfaces, in combination with the substantially rectangular cross section, may also help the stackable weights to stay in place on the water bottom to maintain the lure or bait at a desired location until deliberately moved by tension applied to the line by the angler. Such textured side surfaces can be provided by scoring, stamping, or pressing the side surfaces. When the elongated bars are formed of lead, pressing a texture pattern having strong diagonal elements into the side surfaces has been found to provide increased stiffness for the elongated bars.

DETAILED DESCRIPTION OF THE PREFERRED EMBODIMENTS

Figures 1, 2:
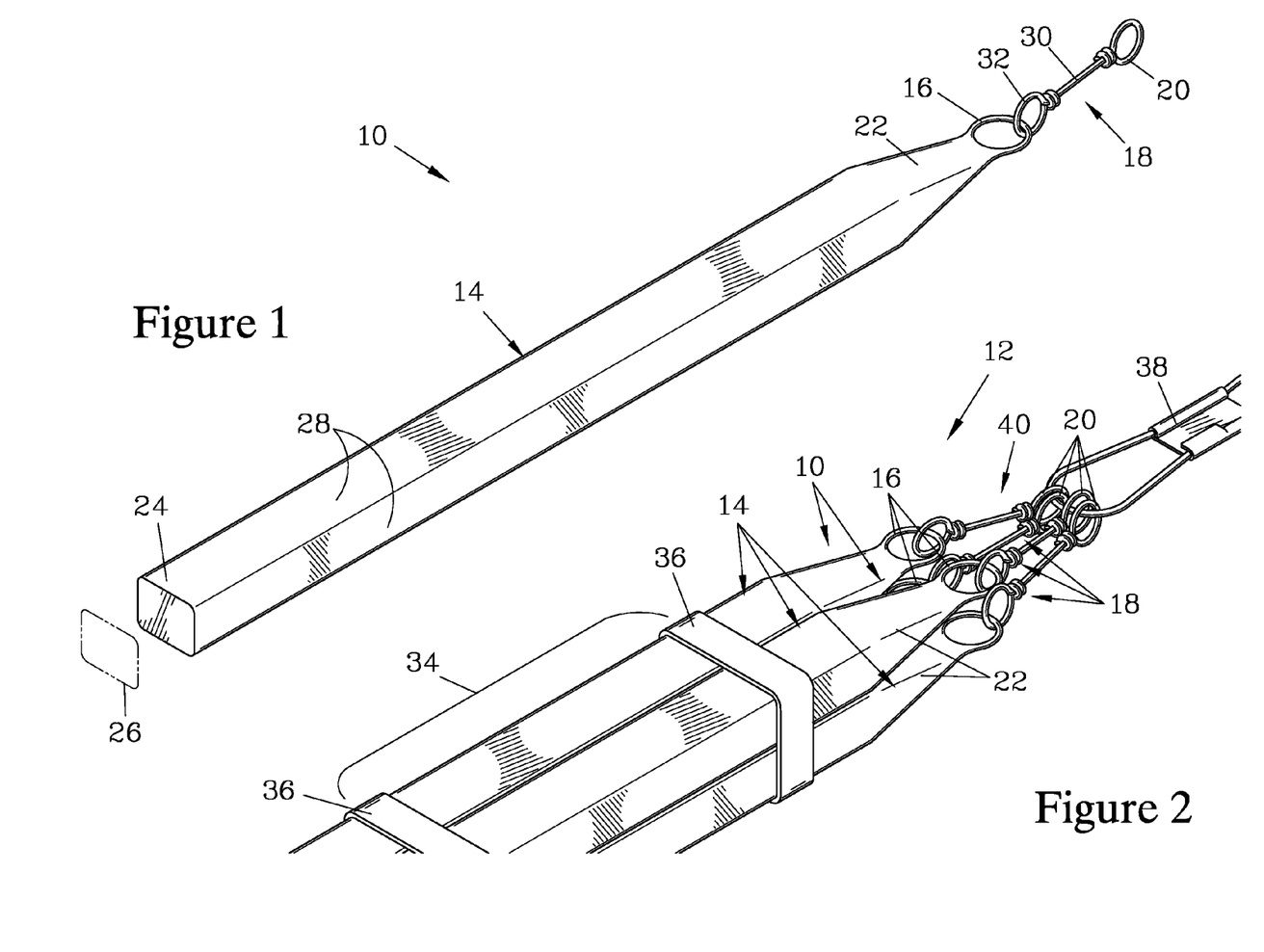
FIG. 1 is an isometric view of a stackable weight which can be employed alone as a sinker or which can be bundled together with additional weights and attached to a common fastener, as shown in FIG. 2. The stackable weight has an elongated bar that terminates at a leading end and a trailing end, and having a rectangular cross section. A fixed eye is affixed to the leading end of the elongated bar, and a link member terminating in a coupling eye is movably attached to the fixed eye.
FIG. 2 is a partial isometric view of a modular sinker formed from a number of stackable weights such as the one shown in FIG. 1, which have been bundled side-by-side and secured together by a lashing formed by a pair of elastic bands. The coupling eyes of the stackable weights are connected to a snap swivel that provides a common attachment point. When so connected, the link members of the stackable weights form a substantially triangular coupling structure that provides ramp surfaces that allow the modular sinker to slip past obstructions.

FIG. 1 is an isometric view of a stackable weight 10 which can be bundled with similar stackable weights 10 to form a modular sinker 12 of the desired weight, as shown in FIG. 2. The stackable weight 10 has an elongated bar 14 with a fixed eye 16 attached thereto, and a link member 18. The link member 18 has a coupling eye 20, and is movably attached to the fixed eye 16.

The elongated bar 14 terminates in a leading end 22, to which the fixed eye 16 attaches, and a trailing end 24. Preferably, the fixed eye 16 is embedded in or forms an integral part of the leading end 22. The elongated bar 14 has a rectangular cross section 26 formed by four substantially planar side surfaces 28. The trailing end 24 is a substantially flat planar surface that is normal to the four substantially planar side surfaces 28. The elongated bar 14 should be formed from a dense, durable material, and typically will be made of metal. Examples of preferred metals are lead, tin, and alloys thereof.

The link member 18 of this embodiment is formed from a length of wire stock, having a link shaft 30 terminating at one end in a link eye 32 and at the other end in the coupling eye 20. The link eye 32 is movably connected to the fixed eye 16 of the elongated bar 14, while the coupling eye 20 is free to be connected to a suitable fastener, as shown in FIG. 2.

FIG. 2 shows the modular sinker 12, which is formed from a bundle of the stackable weights 10 discussed above. A desired number of the stackable weights 10 are employed to obtain the desired overall weight to suit the particular angling conditions. For most angling situations, it has been found sufficient to employ stackable weights 10 having weights of 1 ounce, 1.5 ounces, and 2 ounces. The stackable weights 10 are placed together in a side-by-side relationship, with their leading ends 22 arranged adjacent to each other. The bundled stackable weights 10 are then bound together by a lashing element 34 that passes around the elongated bars 14 of the stackable weights 10. In this embodiment, the lashing element 34 is provided by two elastic bands 36, one located near the leading ends 22 and the other located near the trailing ends 24. While conventional elastic bands made of natural or synthetic rubber can be used, elastic bands made from a stretchable clear plastic material, such as are commercially available for use as clear elastic hair ties, have been found stronger and less prone to breakage in service compared to conventional rubber elastic bands. The two elastic bands serve to maintain the elongated bars 14 parallel to each other in use, providing the modular sinker 12 with a compact overall form. The modular sinker 12 can be assembled without the requirement of special tools, and thus is well suited for the adjustment of the overall weight of the modular sinker 12. The stacked elongated bars 14 also provide the modular sinker 12 with a cross-section with relatively little empty space, providing a dense, compact weight for anchoring to the bottom surface of the water.

Since the coupling eyes 20 of the stackable weights 10 are movable with respect to their associated elongated bars 14, the coupling eyes 20 can be positioned so as to be connected to a single snap fastener 38, which in turn is attached to a fishing line (not shown). When so connected, the link members 18 form triangular-shaped coupling units that, when connected together, form a pyramid-like coupling structure 40 for connecting the elongated bars 14 to the snap fastener 38. The coupling structure 40 serves to provide slightly flexible ramp surfaces, formed by the link members 18, that will tend to assist the modular sinker 12 in sliding past obstructions. Further resistance to becoming snagged by obstructions can be gained by employing the modular sinker 12 with a bait locating device, such as taught in U.S. Pat. No. 5,555,668, and/or a line shield such as taught in the co-pending application Ser. No. 11/828,414 of the present inventor entitled "Snag-Resistant Sinker Line Shield". The attachment of such a line shield is illustrated in the embodiment shown in FIG. 6.

Figures 3, 4:
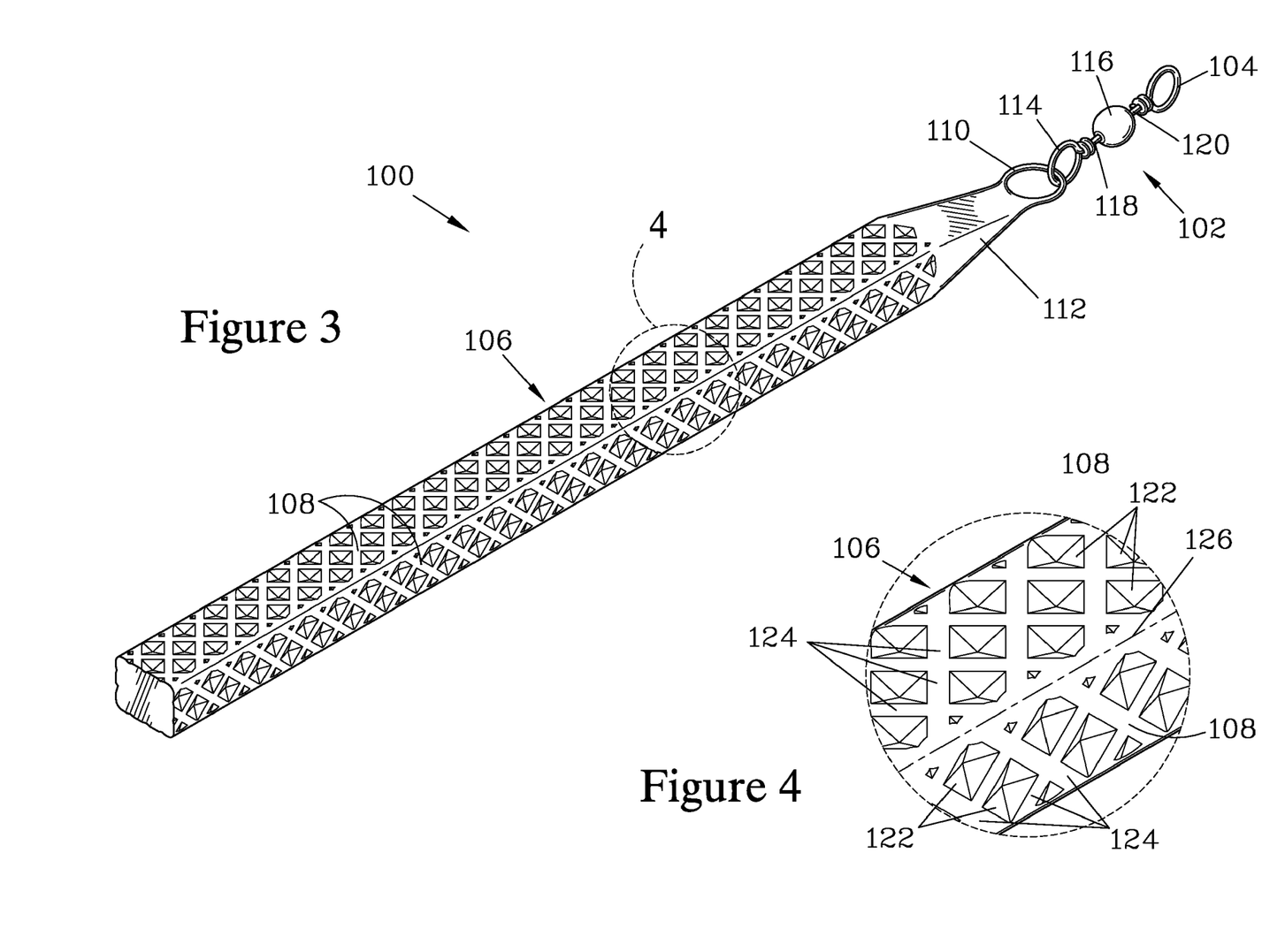
FIG. 3 is an isometric view of a stackable weight which has many features in common with the stackable weight shown in FIG. 1, but which has an elongated bar with textured sides and has a link member formed from a conventional barrel swivel to provide greater freedom of motion of a coupling eye.
FIG. 4 is an enlarged view of the region 4 of FIG. 3, showing one pattern for the textured side surfaces. The pattern has indented diamonds which provide an array of pattern elements that are diagonal to the edges of the side surfaces. When pressed into an elongated bar formed of a relatively soft metal, such as lead, such diagonal pattern elements have been found to stiffen the elongated bar.

FIG. 3 is an isometric view showing a stackable weight 100 that forms another embodiment of the present invention. The stackable weight 100 differs in having a link member 102 that allows a greater range of motion of a coupling eye 104 with respect to an elongated bar 106, and in providing the elongated bar 106 with side surfaces 108 that are textured, as better shown in FIG. 4.

Again, the elongated bar 106 of the stackable weight 100 has a fixed eye 110 affixed to a leading end 112. The link member 102 has a link eye 114, which is movably connected to the fixed eye 110; however, rather than having a link shaft, the link member 102 is formed from a conventional barrel swivel. The link member 102 has a barrel 116 which movably connects a link eye shaft 118, on which the link eye 114 is provided, to a coupling eye shaft 120, on which the coupling eye 104 is provided. In addition to letting the coupling eye 104 rotate with respect to the link eye 114, the barrel 116 allows a small degree of inclination between the link eye shaft 118 and the coupling eye shaft 120, thereby providing a greater range of movement for the coupling eye 104.

FIG. 4 is an enlarged view showing one pattern of texturing which can be applied to the side surfaces 108 of the elongated bar 106. The pattern shown is formed by an array of diamond-shaped indents 122 separated by diagonal ridges 124, which are inclined with respect to a longitudinal axis 126 of the elongated bar 106. The diagonal ridges 124 form diagonal elements that serve to enhance the rigidity of the elongated bar 106, particularly when the elongated bar 106 is formed from a relatively soft metal such as a lead alloy. The pattern can be readily formed by pressing the elongated bar 106 between jaws that have an array of diamond-shaped projections, which press into the elongated bar 106 to form the diamond-shaped indents 122. Alternatively, the texture could be provided by scoring, stamping, or etching the side surfaces 108.

Figure 5:
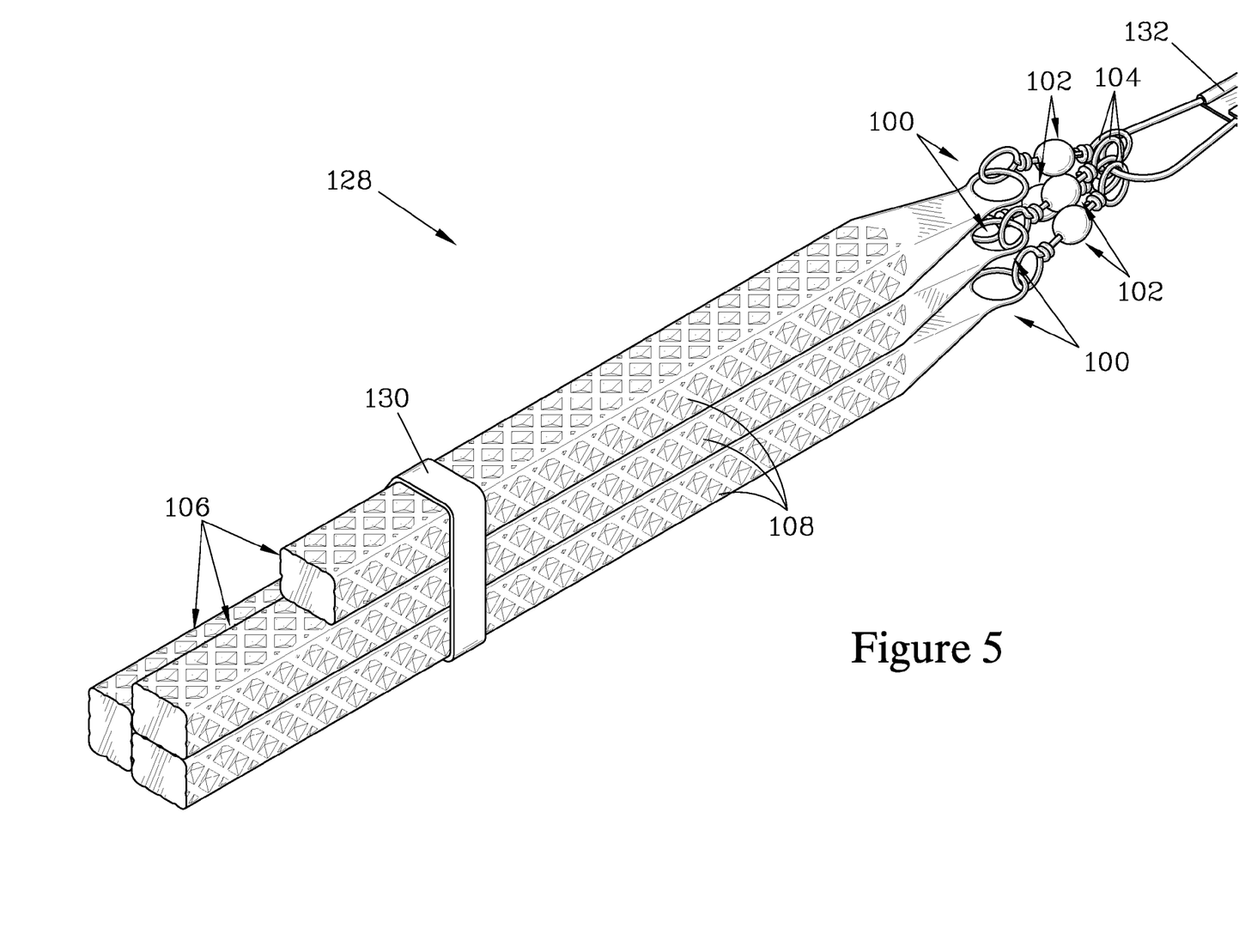
FIG. 5 is an isometric view of a modular sinker formed from a number of stackable weights such as that shown in FIG. 3; again, several weights have been bundled together, secured, and attached to a common snap swivel. Since the textured nature of the sides of the elongated bars reduces slippage of the bars relative to one another, a single elastic band wrapped around the bars is sufficient to provide a lashing in this embodiment.

When a desired number of the stackable weights 100 are bundled together to form a modular sinker 128, as shown in FIG. 5, the texture on the side surfaces 108 causes the side surfaces 108 of adjacent elongated bars 106 to frictionally engage each other to keep the elongated bars 106 from sliding relative to each other. With such textured side surfaces 108, it has been found practical to employ only a single elastic band 130 to provide a lashing element to maintain the elongated bars 106 together. The textured side surfaces 108 also frictionally engage the elastic band 130 to reduce the likelihood of it slipping off if it rubs against an obstruction, thus helping to provide for the integrity of the modular sinker 128 without the introduction of small supplemental parts that would make it difficult to reconfigure the modular sinker in a fishing environment.

Again, since the coupling eyes 104 each have a degree of motion relative to their associated elongated bar 106, the coupling eyes 104 can be connected to a common fastener, such as a snap swivel 132, while the elongated bars 106 remain parallel to each other in a side-by-side relationship. When the coupling eyes 104 of a number of the stackable weights 100 are attached together to form the modular sinker 128, the link members 102 form a substantially triangular coupling structure, which is quasi-conical or quasi-pyramidal. This coupling structure provides a tapered or ramped profile to obstructions and weeds, which should resist snagging of the modular sinker 128, and has some degree of flexibility to allow it to better work around obstructions.

Since the elongated bars 106 are maintained parallel to each other and each have a rectangular cross section, the resulting cross section of the modular sinker 128 can be considered substantially rectangular or quasi-rectangular, and will have a cross section with relatively little empty space to provide the modular sinker 128 with enhanced anchoring ability.

When the stackable weights (10, 100) are provided in differing weights, they allow the user to configure a modular weight to best suit the fishing conditions. For example, when a four ounce weight is needed, such could be provided by bundling together four stackable weights that each weighs one ounce, or by bundling two stackable weights that each weighs two ounces. In the first case, the resulting modular sinker will have a more compact profile, and will tend to provide a better anchoring effect when fishing on a sand or gravel bottom surface. In the latter case, the resulting modular sinker will have an elongated, more streamlined profile, which will be less susceptible to becoming snagged on rocks or weeds. In either case, the bundled stackable weights provide the modular sinker of the present invention with a relatively small wind resistance, allowing the modular sinker to be cast further than a collection of individual weights attached to the line.

Figure 6:
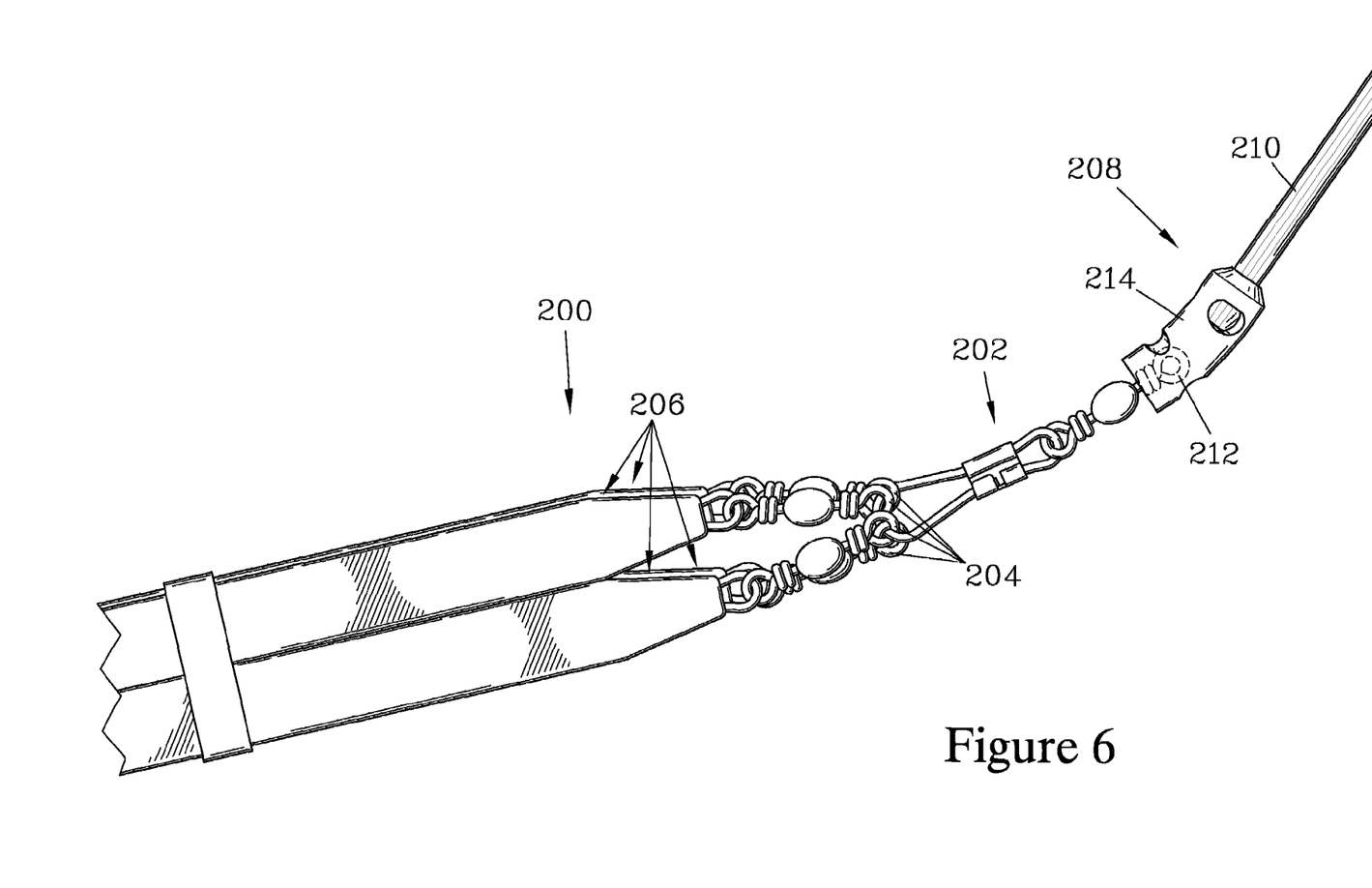
FIG. 6 is a schematic view of a modular sinker similar to those shown in FIGS. 2 and 5, showing a snap swivel to which a line shield has been attached to further reduce the snagging tendency of the modular sinker.

FIG. 6 is an isometric view of a modular sinker 200 similar to the modular sinkers (12, 128) shown in FIGS. 2 and 5; FIG. 6 shows a snap swivel 202 that is connected to a number of coupling eyes 204 of several stackable weights 206 that are bundled together to form the modular sinker 200. The snap swivel 202 in turn has been attached to a line shield 208 to further reduce the likelihood of snagging the modular sinker 200. The line shield 208 has a resilient tube 210 through which a sinker line (not shown) passes before tying to a swivel eye 212 of the snap swivel 202. A resilient hood 214 frictionally engages the tube 210 and the swivel eye 212 to maintain the tube 210 in close proximity to the modular sinker 200, allowing the tube 210 to guide and lift the modular sinker 200 over obstructions. Such line shields are the subject of the present inventor's copending application Ser. No. 11/828,414 entitled "Snag-Resistant Sinker Line Shield".

While the novel features of the present invention have been described in terms of particular embodiments and preferred applications, it should be appreciated by one skilled in the art that substitution of materials and modification of details obviously can be made without departing from the spirit of the invention.

What I claim is:

1. A stackable weight for forming a modular sinker, the weight comprising:
    an elongated bar formed as a single piece of metal terminating at a leading end and a trailing end, said elongated bar having,
        a main body portion that is bounded by four essentially planar sides that form an overall substantially rectangular cross section throughout the length of said main body portion, the substantially rectangular cross section being normal to a longitudinal axis of said elongated bar, said four essentially planar sides each extending substantially parallel to said longitudinal axis,
        a tapered leading portion providing said leading end of said bar, said tapered portion being bounded by at least four surfaces that are inclined with respect to the longitudinal axis, each of said at least four inclined surfaces intersecting and joined to a respective one of said four essentially planar sides of said main body portion, and
        a substantially flat planar surface providing said trailing end of said bar, said substantially flat planar surface being normal to said four essentially planar sides of said main body portion;
    a fixed eye affixed at said leading end of said bar,
        said tapered portion of said bar being configured to provide a smooth transition between said fixed eye and said main body portion of said bar; and
    a link member terminating in a closed link eye and a coupling eye spaced apart from said link eye by at least one shaft, said link eye being movably attached to said fixed eye so as to provide mobility of said coupling eye with respect to said bar.

2. The stackable weight of claim 1 wherein said link member further comprises:
    a barrel swivel.

3. The stackable weight of claim 1 wherein said link member is permanently attached to said fixed eye of said bar.

4. The stackable weight of claim 3 wherein at least one of said essentially planar sides is textured with a pattern of indents.

5. The stackable weight of claim 3 wherein said link member further comprises:
    a barrel swivel.

6. A stackable weight for forming a modular sinker, the weight comprising:
    an elongated bar terminating at a leading end and a trailing end, said elongated bar having a main body portion with four essentially planar sides that provide said main body portion throughout its length with an overall substantially rectangular cross section normal to a longitudinal axis of said elongated bar, said four essentially planar sides each extending substantially parallel to said longitudinal axis, wherein at least one of said essentially planar sides is textured with a pattern of indents, said elongated bar having a tapered leading portion providing said leading end of said bar, said tapered portion being bounded by at least four surfaces that are inclined with respect to the longitudinal axis, each of said at least four inclined surfaces intersecting and joined to a respective one of said four essentially planar sides of said main body portion, and a substantially flat planar surface providing said trailing end of said bar, said substantially flat planar surface being normal to said four essentially planar sides of said main body portion;
    a fixed eye affixed at said leading end of said bar,
        said leading end of said bar being configured to provide a smooth transition between said fixed eye and said main body portion; and
    a link member terminating in a closed link eye and a coupling eye spaced apart from said link eye by at least one shaft, said link eye being movably attached to said fixed eye so as to provide mobility of said coupling eye with respect to said bar.

7. The stackable weight of claim 6 wherein said pattern of indents is formed by pressing said indents into said at least one of said essentially planar sides.

8. The stackable weight of claim 6 wherein said link member further comprises:
    a barrel swivel.

9. The stackable weight of claim 6 wherein said pattern of indents provide a pattern of ridges on said at least one of said essentially planar sides that is textured, said ridges extending diagonally with respect to the longitudinal axis of said elongated bar.

10. A modular sinker comprising:
    a first weight having,
        a first elongated bar terminating at a first bar leading end and a first bar trailing end, said first elongated bar having a substantially rectangular cross section,
        a first bar fixed eye affixed to said first bar leading end of said first elongated bar, and
        a first link member terminating in a first coupling eye, said first link member being movably attached to said first bar fixed eye so as to provide mobility of said first coupling eye with respect to said first bar;
    a second weight having,
        a second elongated bar terminating at a second bar leading end and a second bar trailing end, said second elongated bar having a substantially rectangular cross section,
        a second bar fixed eye affixed to said second bar leading end of said second elongated bar, and
        a second link member terminating in a second coupling eye, said second link member being movably attached to said second bar fixed eye so as to provide mobility of said second coupling eye with respect to said second bar;
    a lashing that encircles both said first elongated bar and said second elongated bar to secure said first elongated bar and said second elongated bar together in a side-by-side abutting relationship; and
    a common fastener connecting to said coupling eyes,
        said first and second link members forming a substantially pyramid-shaped coupling structure when said first and second coupling eyes are connected to said common fastener.

11. The modular sinker of claim 10 wherein said lashing further comprises:
    an elastic band that encircles said first elongated bar and said second elongated bar.

12. The modular sinker of claim 11 wherein said first bar leading end and said second bar leading end are tapered.

13. The modular sinker of claim 12 wherein said first elongated bar and said second elongated bar each further comprises:

textured side surfaces that are textured so as to increase a resistance to sliding between said first elongated bar and said second elongated bar and between said first and second elongated bars and said lashing.

14. The modular sinker of claim 13 wherein said textured side surfaces provide a pattern of diagonal ridges on each of said first elongated bar and said second elongated bar.

15. The modular sinker of claim 11 wherein said first link member and said second link member comprise barrel swivels.

16. The modular sinker of claim 10 wherein said first bar leading end and said second bar leading end are tapered.

17. The modular sinker of claim 16 wherein said first elongated bar and said second elongated bar each further comprises:

textured side surfaces that are textured so as to increase a resistance to sliding between said first elongated bar and said second elongated bar and between said first and second elongated bars and said lashing.

* * * * *